US011962475B2

(12) United States Patent
Vlachou-Konchylaki et al.

(10) Patent No.: US 11,962,475 B2
(45) Date of Patent: Apr. 16, 2024

(54) ESTIMATING PROPERTIES OF UNITS USING SYSTEM STATE GRAPH MODELS

(71) Applicant: Telefonaktiebolaget LM Ericsson (publ), Stockholm (SE)

(72) Inventors: Martha Vlachou-Konchylaki, Stockholm (SE); Efthymios Stathakis, Stockholm (SE); Arthur Gusmao, Rüschlikon (CH); Jörg Niemöller, Sollentuna (SE); Swarup Kumar Mohalik, Bangalore (IN); Yu Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/794,176

(22) PCT Filed: Feb. 3, 2020

(86) PCT No.: PCT/EP2020/052623
§ 371 (c)(1),
(2) Date: Jul. 20, 2022

(87) PCT Pub. No.: WO2021/155905
PCT Pub. Date: Aug. 12, 2021

(65) Prior Publication Data
US 2023/0055373 A1    Feb. 23, 2023

(51) Int. Cl.
*H04L 41/14* (2022.01)
*H04L 41/147* (2022.01)
*H04L 41/16* (2022.01)

(52) U.S. Cl.
CPC ......... *H04L 41/145* (2013.01); *H04L 41/147* (2013.01); *H04L 41/16* (2013.01)

(58) Field of Classification Search
CPC ..... H04L 41/145; H04L 41/147; H04L 41/16; H04L 41/149; H04L 43/16; H04L 41/082; H04W 24/02
See application file for complete search history.

(56) References Cited

U.S. PATENT DOCUMENTS 5,987,442 A * 11/1999 Lewis .................... H04L 43/00
706/10
10,754,959 B1 * 8/2020 Rajasooriya ............. G06N 7/01
(Continued)

FOREIGN PATENT DOCUMENTS

JP      2012141909 A    7/2012
WO      02080458 A1    10/2002

OTHER PUBLICATIONS

International Search Report and Written Opinion of the International Searching Authority for PCT International Application No. PCT/EP2020/052623 dated Oct. 15, 2020.
(Continued)

*Primary Examiner* — John A Follansbee
*Assistant Examiner* — Fadi Haj Said
(74) *Attorney, Agent, or Firm* — Sage Patent Group

(57) ABSTRACT

The properties of a plurality of operational units are estimated by generating a central system state graph model representing the properties of the plurality of operational units as probabilities of transitions between states for the plurality of operational units, where the states represent operational data. Then a respective updated system state graph model is generated for each of the plurality of operational units, based on the central system state graph model and based on new operational data for the respective operational unit. A distance measure is determined between the respective updated system state graph models. If the distance measure fulfils a divergence criterion, a plurality of new central system state graph models are generated, each
(Continued)

representing the properties of a respective subset of the plurality of operational units as the probabilities of transitions between states for the respective subset of the plurality of operational units.

18 Claims, 12 Drawing Sheets

(56) References Cited

U.S. PATENT DOCUMENTS

| | | | |
|---|---|---|---|
| 2003/0169762 A1* | 9/2003 | Wee Ho | H04L 43/00 370/252 |
| 2011/0320228 A1* | 12/2011 | Kowalski | G06Q 10/06393 705/7.11 |
| 2018/0285320 A1 | 10/2018 | Yang et al. | |

OTHER PUBLICATIONS

Telefonaktiebolaget LM Ericsson (Publ), "Configuration of a Communications Network," Patent Application as filed Oct. 18, 2019 as International Application No. PCT/EP2019/078454, 22 pages.

Xie et al., "Unsupervised Deep Embedding for Clustering Analysis," Proceedings of the 33rd International Conference on Machine Learning, New York, NY, USA, 2016, JMLR: W&CP vol. 48, 10 pages.

\* cited by examiner

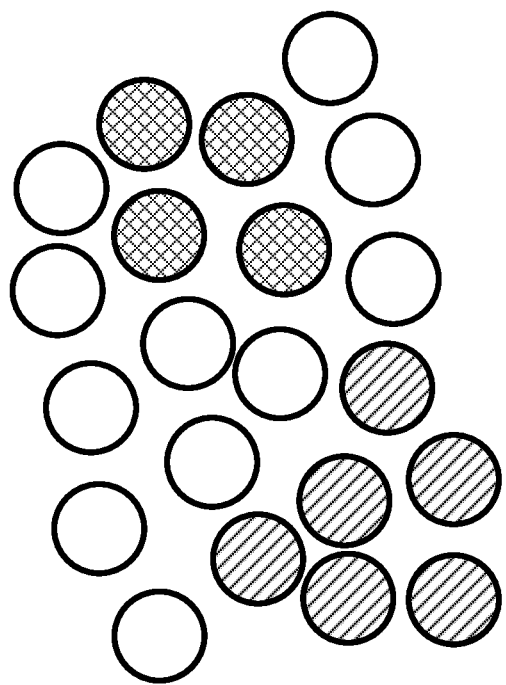
Fig. 12
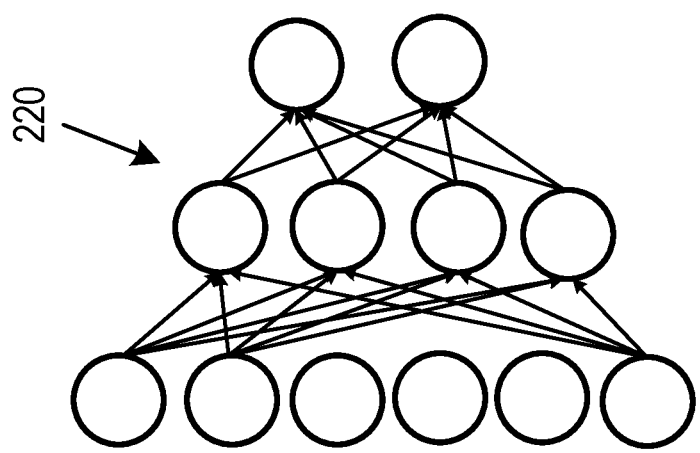

ESTIMATING PROPERTIES OF UNITS USING SYSTEM STATE GRAPH MODELS

CROSS REFERENCE TO RELATED APPLICATION

This application is a 35 U.S.C. § 371 national stage application of PCT International Application No. PCT/EP2020/052623 filed on Feb. 3, 2020, the disclosure and content of which is incorporated by reference herein in its entirety.

TECHNICAL FIELD

This relates to estimating properties of a plurality of operational units.

BACKGROUND

In many technical systems, it is useful to know the properties of operational units of the system, in order to be able to optimise the operation of the units.

One example of such a technical system is a communications network, where the nodes of the network are the operational units.

Telecommunication Operations Support System (OSS) systems gather information about the set of conditions that the network exhibits at a specific moment in time, defined as the state of the network. These conditions can be expressed in terms of Key Performance Indicators (KPIs) and configuration parameters. For example, in a cellular communications network, it is possible to obtain data from the radio network, the transport network, and the core layers, and it generate representations of the cell states, and therefore of the network as a whole, at any given moment. Where the Voice over LTE (VoLTE) service is in focus, it is possible to obtain data from the Gateway GPRS Support Node (GGSN) and IP Multimedia Subsystem (IMS) nodes to establish the VoLTE service level KPIs for each cell, such as the number of calls or the call drop rate. In addition, information about the cell states can also be contained in cell configuration parameters such as the Cell Specific Reference Signal (CRS) gain, downlink capacity and so on.

Existing OSS solutions are stateful, in the sense that they track current and past states in the form of data, and store the data in databases. However, this does not enable continuous action and effect capturing, for solving complex network management problems such as:

1. Proactive decision making, enabled by action-effect prediction information.
2. Planning of actions towards the optimization of some target KPI.
3. Online tracking of cell KPI drift and potential cell grouping for collective data modelling.

The deployment of 5th Generation (5G) cellular networks, with further cell densification, will further increase the complexity of management. Consequently, it would be advantageous to develop solutions for efficient network state representations, which are able to capture and describe important information in real-time and with manageable complexity.

In particular, performing real-time decision-making in a manageable yet rich representation of the states requires heavy data pre-processing and complex online updates. Machine Learning (ML) algorithms can be used to extract insights from raw data, yet the pool of ML methods with efficient online updates is limited to very few, e.g., neural networks or Least Squares (LS) regression. However, even if we could manage to construct a model update with low complexity, it is not certain that the decision-making process can be updated at the same rate and with equally low complexity. In other words, when the model has gone through a few update iterations, then it is not clear how the new version can be used for decision making. For instance, it may be necessary to separate the data sources into different clusters in order to maintain reliable models if the KPI distributions in some cells start to drift significantly due to fundamental changes in the cell. This is especially true and hard to identify in the case of black-box models, where model updates change the outcome of the model in ways that are not intuitively clear.

Finite state-models, which can be constructed by clustering Markov-chains, can be used to offer transparency in the decision-making process. One possibility is to capture data from existing cell records, and build a system representation that can be used to extract various hidden insights. The idea is to use the data from all of a group of cells (for example all of the cells in a specific area) in order to have sufficient data for a rich system state representation.

However, this presents certain challenges. For example, since data from various cells is aggregated in order to train the model of the system, a reliable model requires the cells to have similar properties. If a single model is used to represent cells with very different properties, then the model will be unreliable, which will lead to badly-informed decisions being made.

SUMMARY

According to an aspect of the invention, there is provided a method of estimating properties of a plurality of operational units. The method comprises generating a central system state graph model representing the properties of the plurality of operational units as probabilities of transitions between states of the plurality of operational units, wherein the states represent operational data. The method then comprises generating a respective updated system state graph model for each of the plurality of operational units, based on the central system state graph model and based on new operational data for the respective operational unit, wherein each updated system state graph model represents the properties of the respective operational unit as probabilities of transitions between states for the respective operational unit. A distance measure between the respective updated system state graph models is then determined. If the distance measure between the respective updated system state graph models fulfils a divergence criterion, a plurality of new central system state graph models are generated, each representing the properties of a respective subset of the plurality of operational units as probabilities of transitions between states for the respective subset of the plurality of operational units.

According to a second aspect, there is provided a method of estimating properties of a plurality of radio network nodes. The method comprises generating a central system state graph model representing the properties of the plurality of radio network nodes as probabilities of transitions between states of the plurality of radio network nodes, wherein the states represent operational data. The method then comprises generating a respective updated system state graph model for each of the plurality of radio network nodes, based on the central system state graph model and based on new operational data for the respective radio network node, wherein each updated system state graph model represents the properties of the respective radio network node as probabilities of transitions between states for the respective radio network node. A distance measure between the respective updated system state graph models is then determined. If the distance measure between the respective updated system state graph models fulfils a divergence criterion, a plurality of new central system state graph models are generated, each representing the properties of a respective subset of the plurality of radio network nodes as probabilities of transitions between states for the respective subset of the plurality of radio network nodes.

According to a third aspect, there is provided a device for estimating properties of a plurality of operational units. The device comprises a processor. The processor is configured to perform a method comprising: generating a central system state graph model representing the properties of the plurality of operational units as probabilities of transitions between states of the plurality of operational units, wherein the states represent operational data; generating a respective updated system state graph model for each of the plurality of operational units, based on the central system state graph model and based on new operational data for the respective operational unit, wherein each updated system state graph model represents the properties of the respective operational unit as probabilities of transitions between states for the respective operational unit; determining a distance measure between the respective updated system state graph models; and, if the distance measure between the respective updated system state graph models fulfils a divergence criterion, generating a plurality of new central system state graph models, each representing the properties of a respective subset of the plurality of operational units as probabilities of transitions between states for the respective subset of the plurality of operational units.

According to a further aspect, there is provided a device for estimating properties of a plurality of operational units, the device being configured for performing a method according to the first aspect.

According to a further aspect, there is provided a computer program product, comprising a tangible and/or non-transitory medium, provided with computer-readable instructions for configuring a processor to perform a method according to the first aspect.

Thus, there is provided a method and system that allow a manageable real-time representation of the status of the operational units in a system such as a communications network, and efficient utilization of memory and computing resources. This in turn allows a user of the system to make more accurate decisions about the operation of the system, based on the representation of the status.

BRIEF DESCRIPTION OF THE DRAWINGS

For a better understanding of the present invention, and to show how it may be put into effect, reference will now be made, by way of example only, to the following figures, in which:—

FIG. 12 illustrates a further step in the method of FIG. 5.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

As mentioned above, the methods described herein can be applied in a wide range of technical systems, where the technical system includes multiple operational units. Specifically, the methods described herein provide information about the properties of the operational units of the system, in order to be able to optimise the operation of the units.

One example of such a technical system is a communications network, where the radio network nodes of the network are the operational units. The methods will be described further below with reference to such a specific example.

Figure 1:
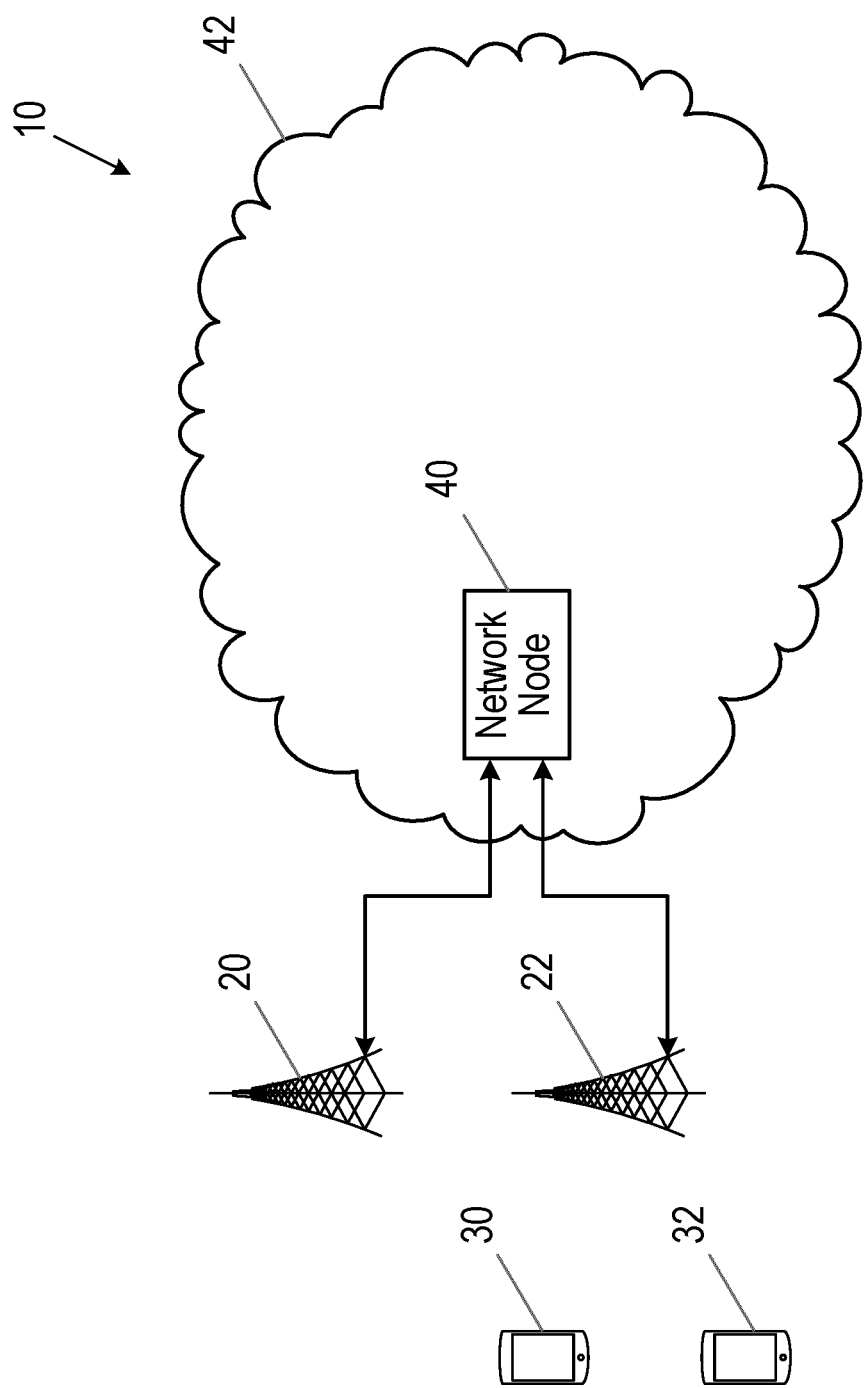
FIG. 1 is a schematic representation of a part of a communications network.

As mentioned above, the methods described herein will be described with specific reference to a technical system in the form of a communications network, and FIG. 1 illustrates a part of a communications network 10, comprising multiple base stations 20, 22. The base stations 20, 22 provide service to UEs 30, 32 in their vicinity, and are connected to a network node 40 in a core network 42 of the communications network.

It will be appreciated that FIG. 1 shows just a small part of the communications network, but this is sufficient for an understanding of the present invention.

Figure 2:
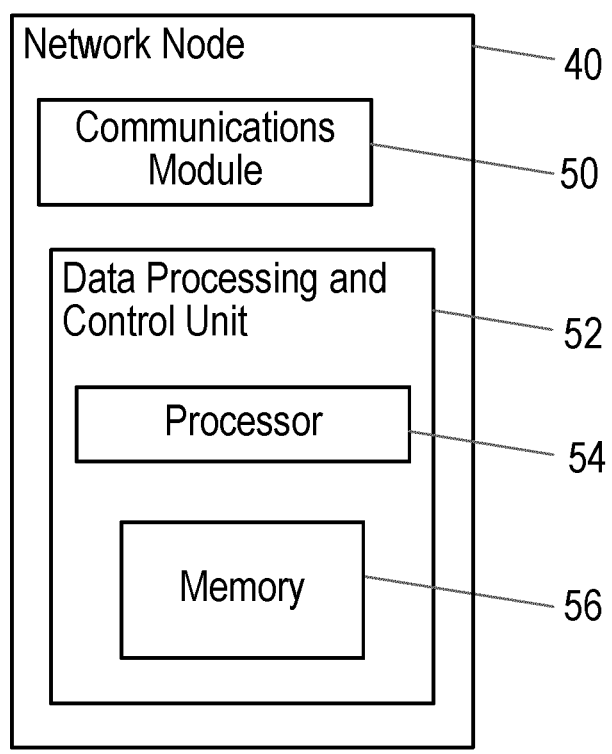
FIG. 2 illustrates the form of a network node in the communications network of FIG. 1.

FIG. 2 shows a part of the network node 40. Specifically, FIG. 2 shows the network node 40 as a device having a communications module 50 and a data processing and control unit 52.

The communications module 50 is configured for communicating with other entities in the network, for example by transmitting and receiving signals in accordance with suitable communications standards. The data processing and control unit 52 includes a processor 54 and a memory 56. The processor 54, which may include one or more processing device, which may be co-located or may be in different locations, performs data processing and logical operations, and the memory 56, which may comprise one or more memory device, which may be co-located or may be in different locations, stores working data and program instructions for causing the processor 54 to perform the methods described herein. The program instructions configured to cause a suitably programmed processor to perform a method as described herein may be provided as a separate computer program product.

Figure 3:
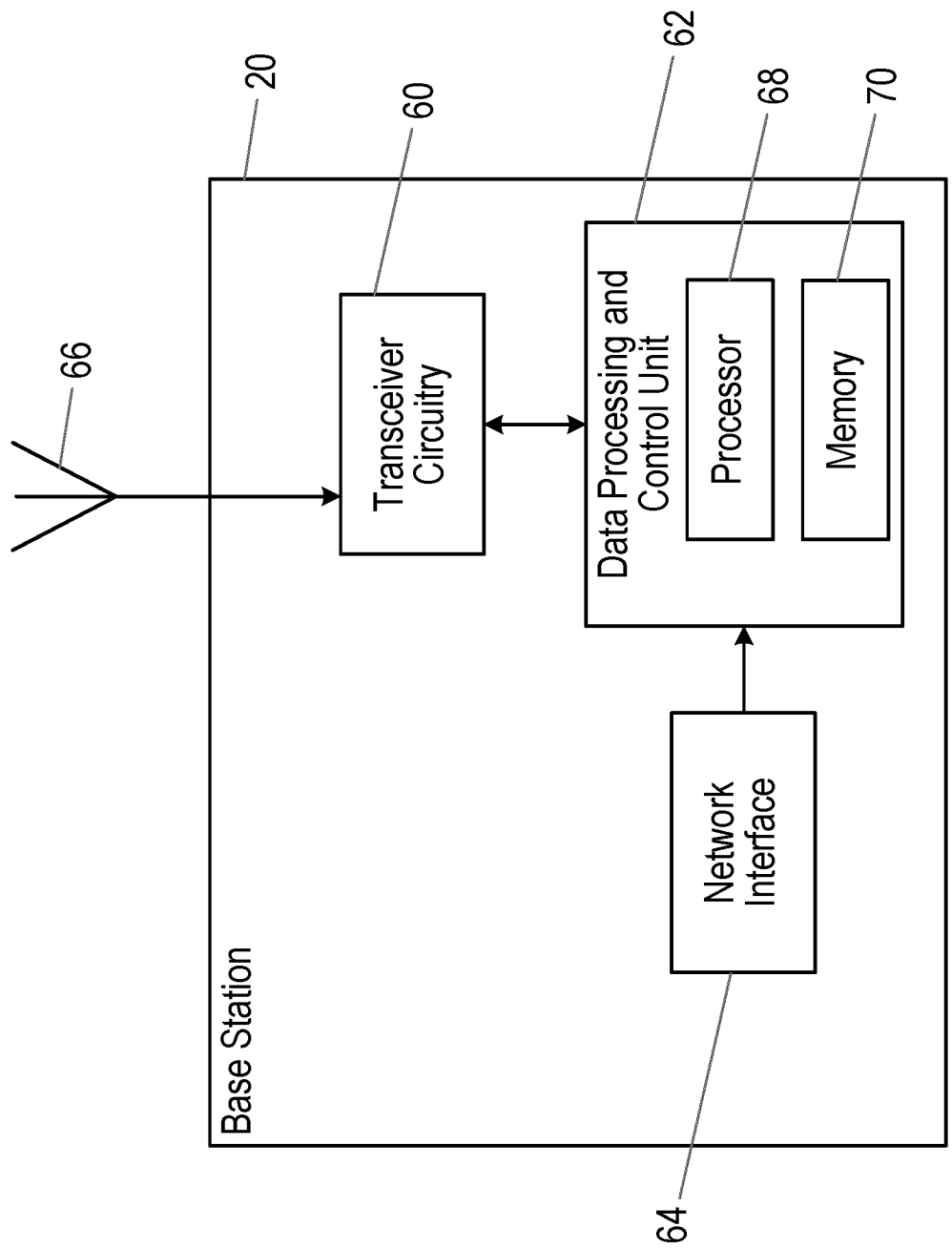
FIG. 3 illustrates the form of a base station in the communications network of FIG. 1.

FIG. 3 shows a part of a radio network node, in the form of a base station 20. Specifically, FIG. 3 shows the base station 20 having transceiver circuitry 60, a data processing and control unit 62, and a network interface 64.

The transceiver circuitry 60 is configured for communicating with wireless entities such as UEs in the network, for example by transmitting and receiving signals via the antenna 66 in accordance with a suitable communications standard. The data processing and control unit 62 includes a processor 68 and a memory 70. The processor 68, which may include one or more processing device, which may be co-located or may be in different locations, performs data processing and logical operations, and the memory 70, which may comprise one or more memory device, which may be co-located or may be in different locations, stores working data and program instructions for causing the processor 68 to perform the methods described herein. The program instructions configured to cause a suitably programmed processor to perform a method as described herein may be provided as a separate computer program product. The network interface 64 is configured for communicating with other network nodes, for example by transmitting and receiving signals over wired network connections in accordance with suitable communications standards.

It will be appreciated that the network may include multiple nodes, with the functionality of the method described herein being distributed between those different nodes, or the functionality may be performed in a single physical node.

Figure 4:
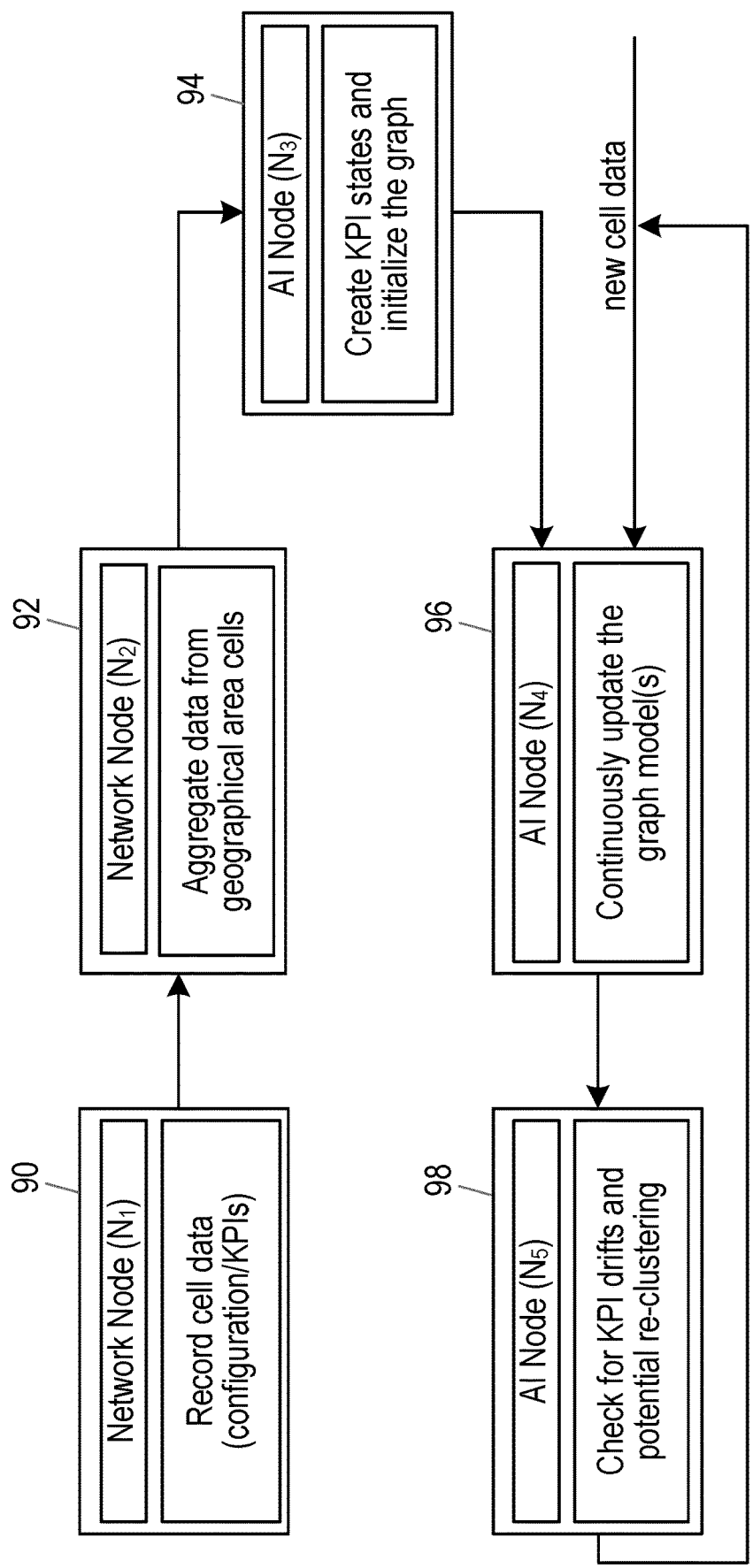
FIG. 4 is an overview of the configuration architecture of the communications network of FIG. 1.

FIG. 4 shows an example in which the different functions described herein are performed in different nodes, but as mentioned above these functions may be grouped as appropriate in any number of physical locations.

Specifically, FIG. 4 shows an example in which a first network node or element 90 records information about the state of a cell and/or a radio network node, in the form of a base station (or nodeB) that is serving that cell. The radio network node may for example be a radio base station in accordance with 3GPP standards, or may be an IEEE 802.11 wireless access point. As described in more detail below, this information relates to configuration features and KPIs of the cell and/or base station.

The information from multiple radio network nodes, for example serving the cells within a specific geographical area, is aggregated by a second network node or element 92. For example, the second network node 92 may be a network management node, which receives information from multiple first radio network nodes 90 about multiple cells.

An artificial intelligence (AI) node or element 94 receives the aggregated data, and generates a system state graph model representing the properties of the plurality of operational units. As mentioned above, in the example where the operational units are radio network nodes serving the cells of a network, the received information relates to configuration features and KPIs of the cells. This information is expressed as a state of the cell, and the system state graph model represents the probabilities of transitions between states.

The initial system state graph model is passed to a second AI node or element 96, which continuously updates the system state graph model on the basis of new operational data received from the operational units, namely the cells of the network, in the illustrated example.

In addition, as described in more detail below, a third AI node or element 98 checks for drifts in the system, for example in the KPIs, and determines whether it is still appropriate to use a single system state graph model to represent the properties of all of the operational units, or whether it would be preferable to perform re-clustering, for example such that multiple system state graph models are used to represent the properties of respective subsets of the operational units.

FIG. 4 shows the different functions being performed in different nodes or elements, but it will be appreciated that these may be co-located and/or provided in a single node, for example the network node 40 as shown in FIG. 2. Thus, a node such as the network node 40 is a device that is configured for performing the methods described herein. However, the methods may be performed by any suitable device having a processor that is programmed to perform the relevant methods.

Specifically, the described method continuously monitors the cells in a group, and is able to infer if the KPI distributions of some cells start to drift. This is because, during some periods, it will be beneficial for modelling accuracy and the overall system performance to form clusters or smaller groups of cells from within the group of cells, where the state distributions of the cells in the cluster are closer together, with respect to some metric.

Without this monitoring mechanism, a single model may attempt to model cells with very different KPI distributions, resulting in a simplistic and unreliable model, which in turn would result in not well-informed decisions regarding the operation of the system.

Figure 5:
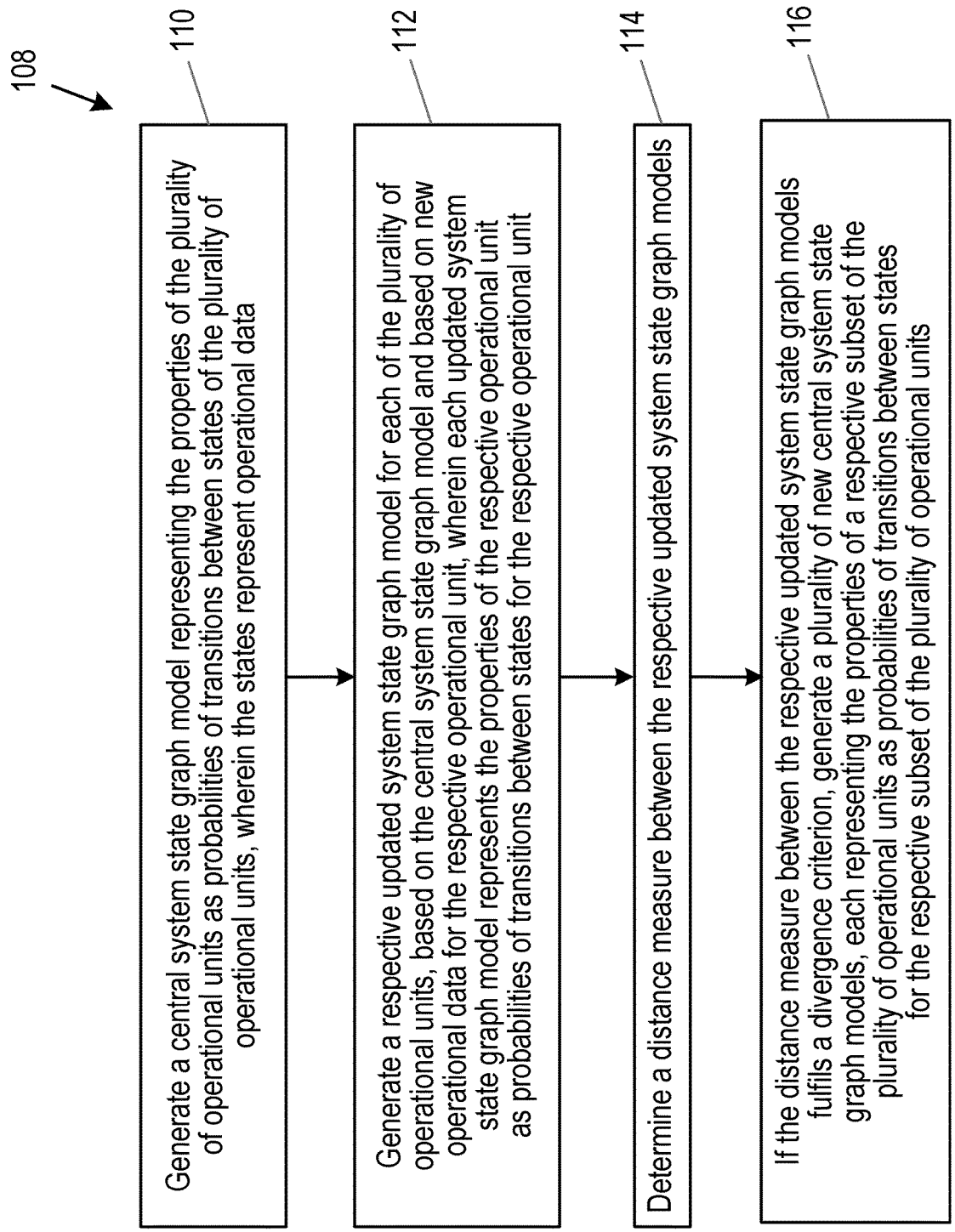
FIG. 5 is a flow chart illustrating a first method according to the disclosure.

FIG. 5 is a flow chart illustrating a method according to the disclosure.

Specifically, the method of FIG. 5 is a method 108 of estimating properties of a plurality of operational units. As discussed previously, in the illustrated example, the operational units are the radio network nodes serving the cells of a communication network. The method starts, at step 110, with generating a central system state graph model representing the properties of the plurality of operational units. Specifically, states of the operational units are defined, where the states represent operational data, and the system state graph model represents the properties of the units as probabilities of transitions between states.

Figure 6:
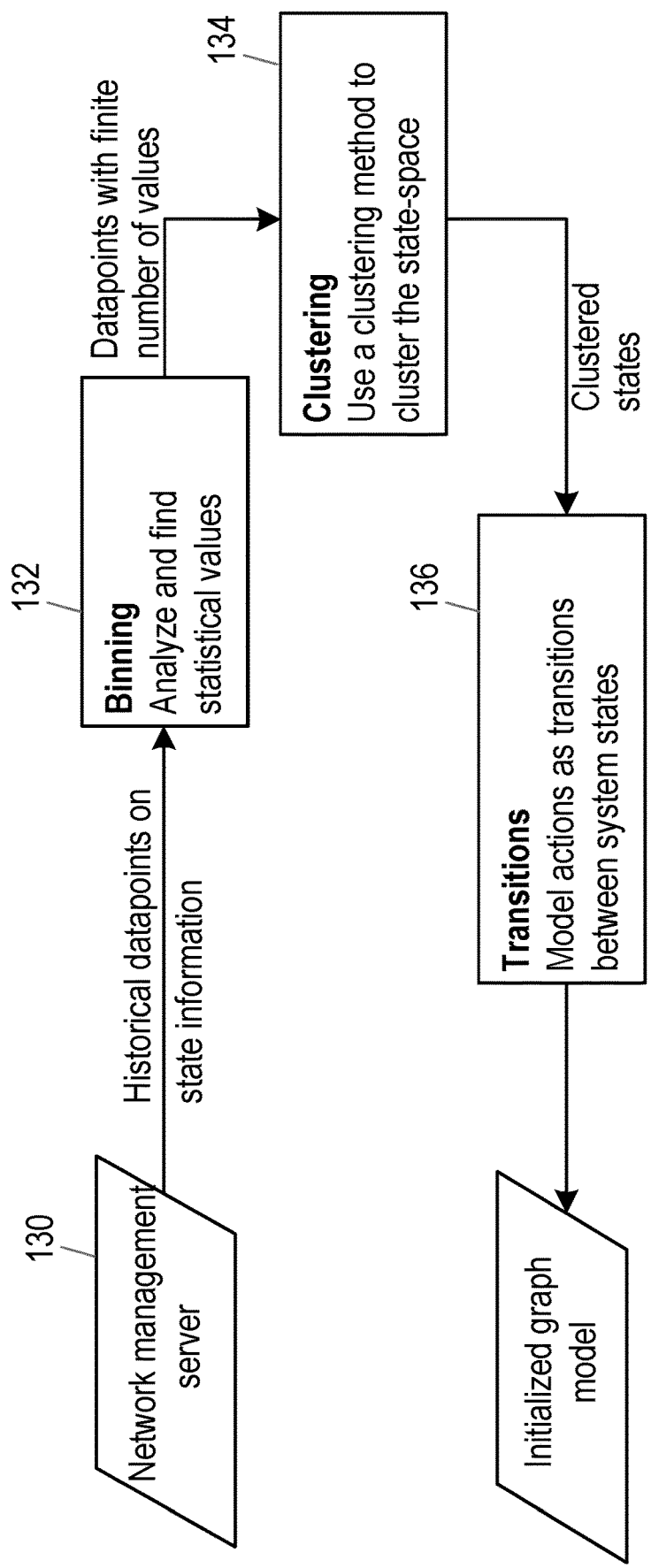
FIG. 6 is a flow chart illustrating a step in the method of FIG. 5.

FIG. 6 is a flow chart illustrating in more detail the step of generating an initial central system state graph model representing the properties of the plurality of units.

The method of FIG. 6 starts by obtaining operational data from a network management server 130. The operational data may be the current operational data of the cell, or may include historical data.

For example, depending on the required application, data relating to the at least one performance indicator may be recorded once per week, once per day, once per 6 hours, once per hour, once per 15 minutes etc.

The operational data comprise state information for the cells. That is, the operational data comprise, for each of a plurality of time periods, data relating to at least one performance indicator of the cell or radio network node, and data relating to at least one configuration parameter of the cell or radio network node. The configuration parameters are the parameters that are set by the network operator, while the performance indicators show the results of applying the configuration parameters.

Thus, each new datapoint from the participating cells corresponds to a single cell and has the following form:

datapoint=[$KPI_1$,$KPI_2$, . . . ,$KPI_n$,configuration_parameter$_1$,configuration_parameter$_2$, . . . ,configuration_parameter$_m$]

In one example, each datapoint may comprise two KPIs (i.e. n=2 in the form of the datapoint given above) and three configuration parameters (i.e. m=3 in the form of the datapoint given above). In one specific example, where the VoLTE service is of particular interest, the KPIs are the VoLTE_Drop_Rate, and the VoLTE_Muting_Rate, and the configuration parameters are the CRS_Gain, the Cell_Downlink_Capacity, and the cell_Subscription_Capacity.

Therefore, the state of a cell is represented as a vector of features containing information that is needed to define how the cell is performing and how it is configured. In the specific example given above, the cell state can be represented by the following 5-element vector: [VoLTE_Drop_Rate, VoLTE_Muting_Rate, CRS_Gain, Cell_Downlink_Capacity, cell_Subscription_Capacity].

The same process can be applied to any parameters that are of particular interest in connection with the quality-of-service that is delivered to the end user equipment devices, UEs, and that is relevant for the users' perceived experience, for example in the case of mobile broadband, for example for video streaming, file downloading or web browsing, and Voice-over LTE (VoLTE) calls. There are numerous ways to describe performance from a network perspective, for example by registering individual incidents. In the case of VoLTE, such incidents would be the number of dropped calls or the setup delay, whereas for HTTP-based adaptive streaming (HAS) services, such incidents would be the number of stalling events or the playback quality degradation.

Many of the parameter values that are reflected in the received datapoint are continuously variable. Therefore, in order to make the data more easily useable, at step 132 in FIG. 6 a binning process may be applied.

That is, for each feature, which is an element in the above datapoint vector, one can apply binning to yield a finite vector space. The binning that is applied may be predefined, or may depend on the received data itself. For example, in order to decide the binning of each feature, one can use either domain knowledge or statistical information on the feature distribution. One way to use statistical information is to group the feature values based on quantiles, but other grouping methods are possible, for example using a variable number of bins via density-based clustering.

For example, for one of the elements in the datapoint vector, say the first key performance indicator $KPI_1$, we can extract the historical distribution as a normal distribution with the following statistical points:
0th percentile at 0.00
25th percentile at 0.08
50th percentile at 0.20
75th percentile at 0.50
100th percentile at 1.00

We can use this information to create a bin mapping, with two columns, as follows

| (value of $KPI_1$ in datapointi] | → | centroid |
|---|---|---|
| (0-0.08] | → | 0.04 |
| (0.08-0.2] | → | 0.14 |
| (0.2-0.5] | → | 0.35 |
| (0.5-1] | → | 0.75 |

If there is no value that falls within a bin, we still consider this bin in our system state graph model described below, but its probability mass is zero.

This binning therefore ensures that the resulting datapoints take a finite number of values.

These datapoints are then applied to a clustering process 134. Specifically, clustering is performed in the above multidimensional space to further decrease the complexity of the representation.

Figure 7:
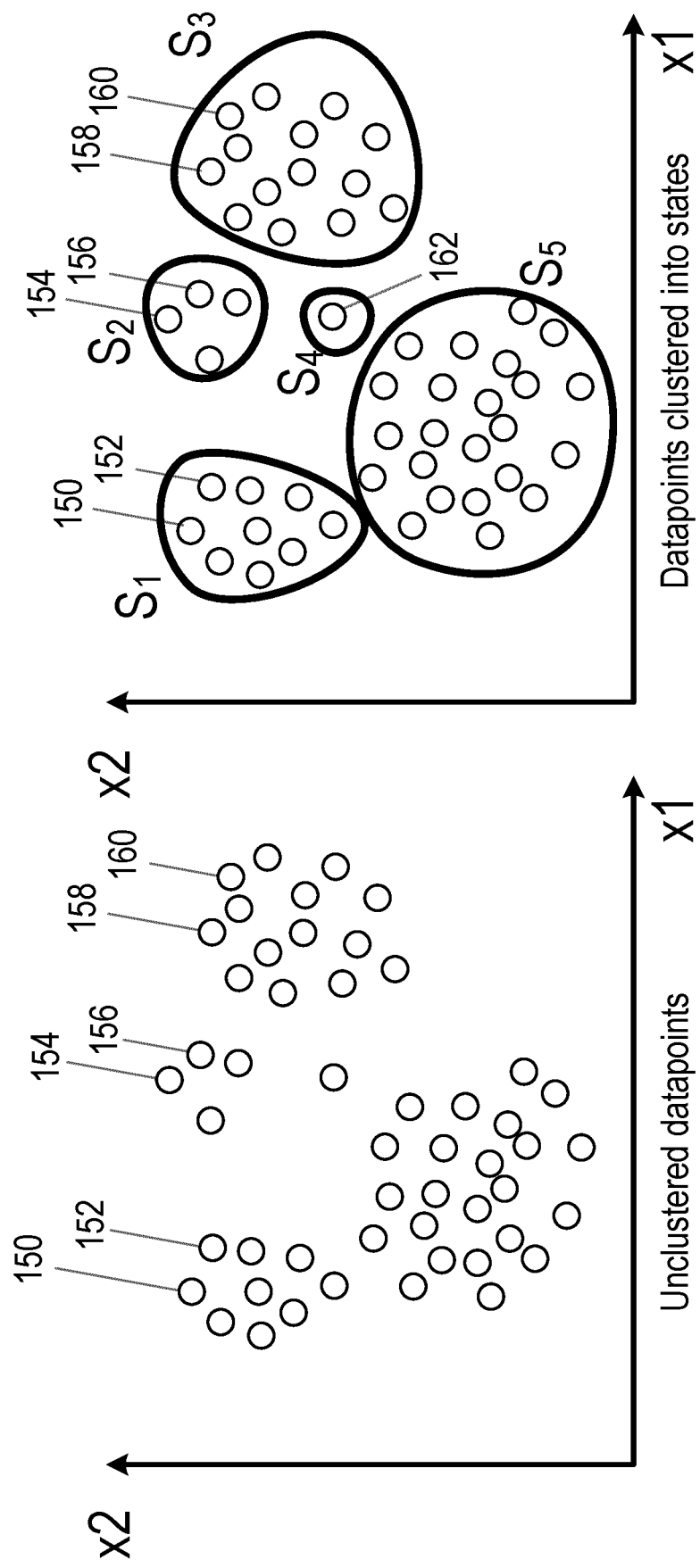
FIG. 7 illustrates a step in the method of FIG. 5.

FIG. 7 shows the effect of clustering on the datapoints. For ease of representation and comprehension, FIG. 7 shows a two-dimensional space, where each datapoint is a two-dimensional vector, for example representing one KPI, say x1, and one configuration parameter, say x2. In the case where the datapoint is a 5-element (i.e. 5-dimensional) vector as described above, the required space is a 5-dimensional space.

The left side of FIG. 7 shows multiple datapoints, for example the datapoints 150, 152, 154, 156, 158, 160.

The right side of FIG. 7 shows the datapoints being clustered into states, and this clustering may be performed by any suitable clustering method. In this example, the datapoints 150, 152, etc are clustered into a first state $S_1$, the datapoints 154, 156, etc are clustered into a second state $S_2$, the datapoints 158, 160, etc are clustered into a third state $S_3$, a single datapoint 162 that is relatively remote from the other datapoints is the only datapoint in a fourth state $S_4$, and various datapoints are clustered into a fifth state $S_5$.

As also shown in FIG. 7, the fourth state $S_4$ that contains only one datapoint may be combined with the third state $S_3$.

The clustered states are then used in determining state transitions, at step 136 in FIG. 6.

The transitions between states correspond to actions taken on the network cells.

Figure 8:
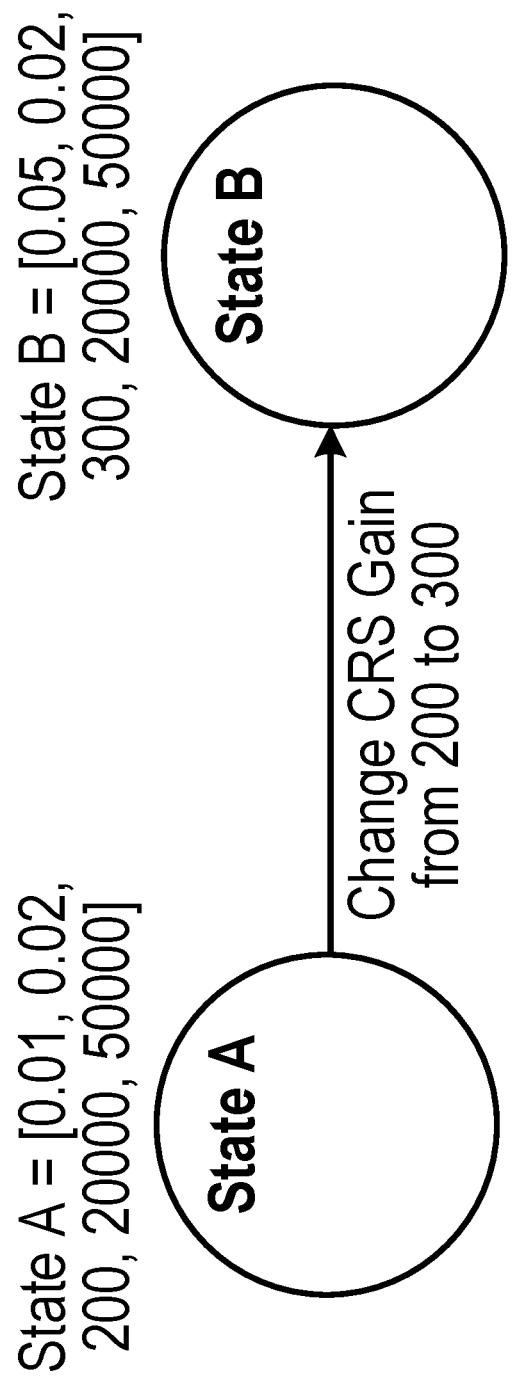
FIG. 8 illustrates a transition between states in the communications network of FIG. 1.

FIG. 8 represents one such state transition, in an example situation where the cell state is represented by the 5-element vector mentioned above: [VoLTE_Drop_Rate, VoLTE_Muting_Rate, CRS_Gain, Cell_Downlink_Capacity, cell_Subscription_Capacity].

State A is the state associated with the datapoint from one particular cell at one particular time. Specifically, the values of the KPIs and configuration parameters associated with State A are [0.01, 0.02, 200, 20000, 50000].

In this example, one of the configuration parameter values is changed, and specifically the CRS_Gain value is changed from 200 to 300. In this case, this results in an increase in the VoLTE_Drop_Rate. After binning and clustering, it is determined that the cell transitions to State B, where the values of the KPIs and configuration parameters associated with State A are [0.05, 0.02, 300, 20000, 50000].

It will be appreciated that such changes are not deterministic, and that changing a particular configuration parameter value in a particular way will not always produce the same change in the measured KPIs.

Thus, the state transitions in the system that are discovered from the received datapoints are used to generate a state graph model that represents the properties of the units as the probabilities of transitions between states.

Specifically, to keep track of all transitions, we use the frequencies of the actions a that trigger the transition between two states S and S'. We use those frequencies to compute the probabilities for the (S, a, S') triple.

More specifically, for two states $S_i$ and $S_j$, where a is an action that is taken while the unit is in state $S_i$ and that is followed by the unit moving to state $S_j$, $n_{ij}^a$ is the empirically observed frequency with which $S_j$ has resulted when the action a was taken while the unit was in the state $S_i$, that is, the number of occasions on which performing the action a while the unit was in the state $S_i$ has been followed by the unit moving to the state $S_j$.

The probabilities for different resulting states $S_j$ can be calculated as follows:

$$P(S_j \mid S_i, a) = \frac{n_{ij}^a}{\sum_k n_{ik}^a}$$

That is, the probability that taking action a while the unit is in state $S_i$ will lead to state $S_j$ can be calculated as the number of occasions on which performing the action a while the unit was in the state S, has been followed by the unit moving to the state $S_j$ divided by the total number of occasions on which the action a has been performed while the unit was in the state $S_i$.

Figure 9:
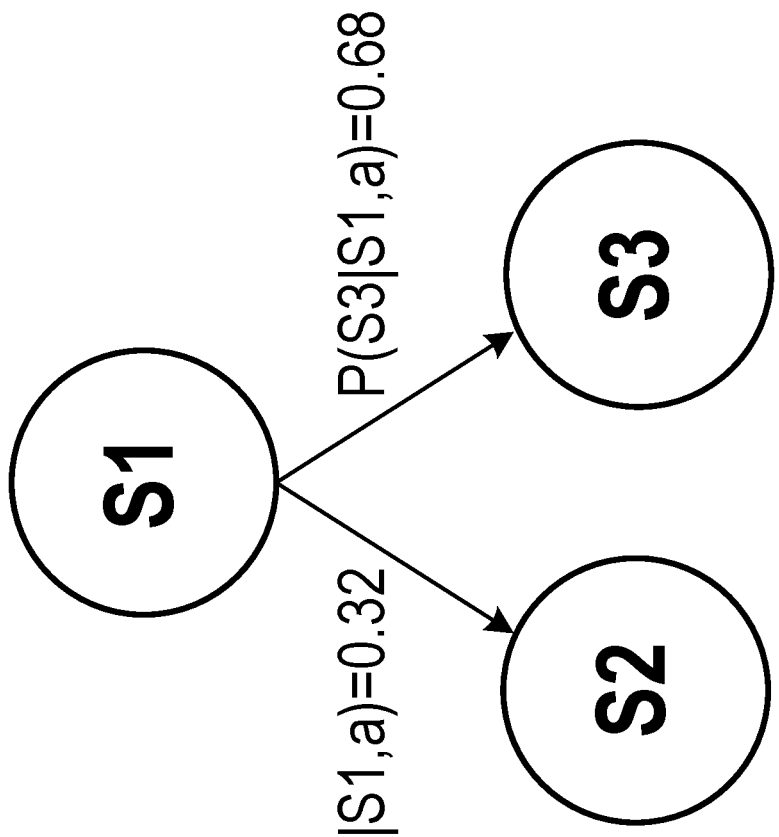
FIG. 9 illustrates a part of a system state graph model.
Figure 9:
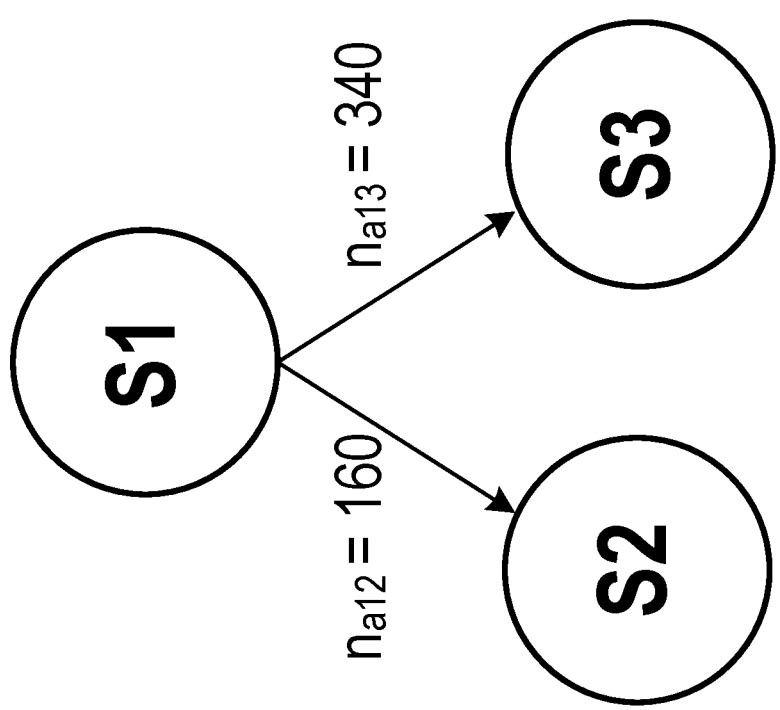

One example of this is shown in FIG. 9.

FIG. 9 relates to a simplified example in which there is a single configuration parameter, CRS_Gain, and two performance indicators, $KPI_1$ and $KPI_2$. Thus, the state S is expressed as a three element vector, i.e. S=[$KPI_1$, $KPI_2$, CRS_Gain].

This example considers an action a that is taken while the unit is in a specific state S1, and that has led in the past to two different states S2 and S3.

For example:
S1=[0.14, 0.14, 200]
a=change CRS_Gain from 200 to 300
S2=[0.35, 0.35, 300]
S3=[0.04, 0.04, 300]

Thus, it has been observed that, starting from the specific state S1, changing the CRS_Gain configuration parameter from a value of 200 to 300 has been followed by increased KPI values on some occasions and has been followed by reduced KPI values on some other occasions.

Specifically, the left side of FIG. 9 shows that, starting from the specific state S1, changing the CRS_Gain configuration parameter from a value of 200 to 300 has been followed by state $S_2$, with the increased KPI values, on 160 occasions and has been followed by state $S_3$, with the reduced KPI values, on 340 occasions.

That is: $n_{12}^a$=160 and $n_{13}^a$=340.

Therefore, the relevant probabilities can be calculated as:

$$P(S_2 \mid S_1, a) = \frac{160}{160 + 340} = 0.32$$

$$P(S_3 \mid S_1, a) = \frac{340}{160 + 340} = 0.68$$

Obtaining this information for all states of the system, and aggregating it, allows the construction of a system state graph model, which represents the properties of the units making up the system as the probabilities of transitions between states.

Figure 10:
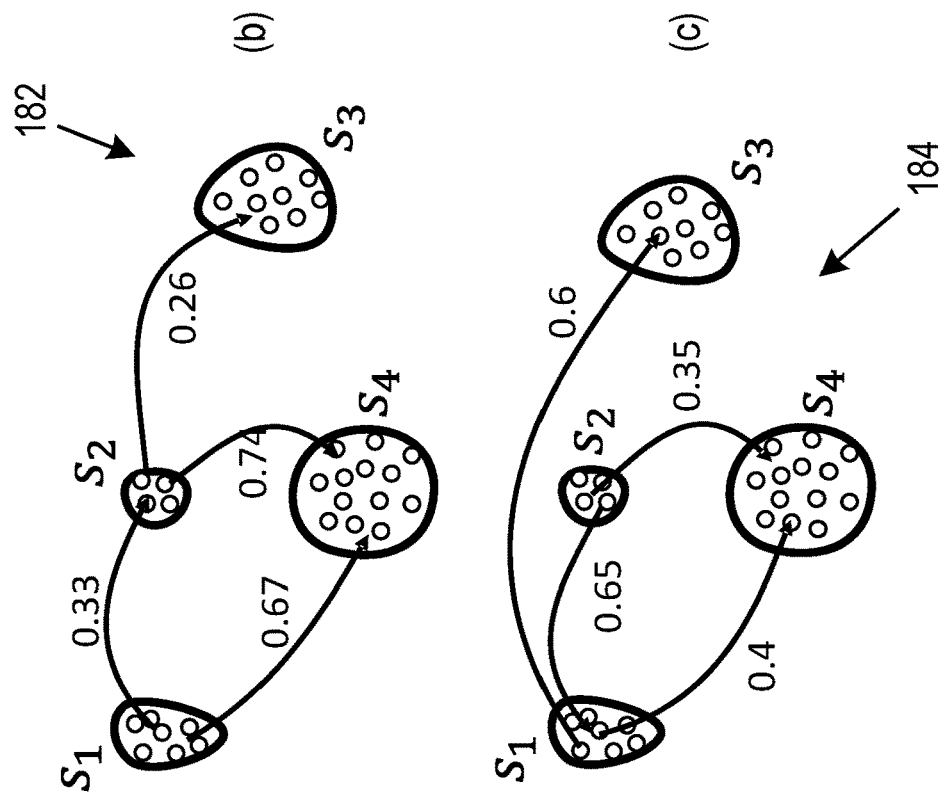
FIG. 10 illustrates parts of further system state graph models.
Figure 10:
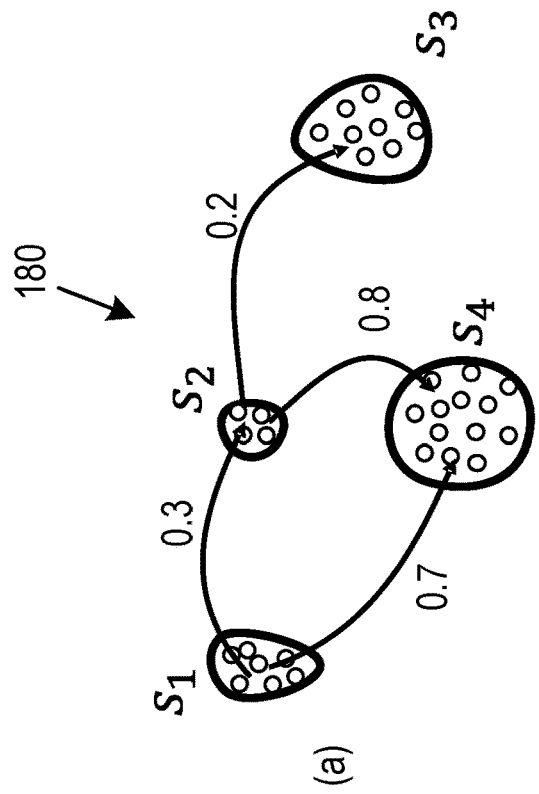

FIG. 10 shows a simplified example of a probabilistic system state graph model.

Specifically, FIG. 10(a) shows an initial system state graph model, which is used to represent the properties of units in a system having four states $S_1$, $S_2$, $S_3$, and $S_4$. Taking a first action b while a unit is in the state $S_1$ has led with probability 0.3 to the state $S_2$, and has led with probability 0.7 to the state $S_4$. Taking a second action c while a unit is in the state $S_2$ has led with probability 0.2 to the state $S_3$, and has led with probability 0.8 to the state $S_4$.

That is:
$P(S_2|S_1,b)$=0.3
$P(S_4|S_1,b)$=0.7
$P(S_3|S_2,c)$=0.2
$P(S_4|S_2,c)$=0.8.

The information contained in the system state graph model can be used to manage the units, for example by identifying actions that can be taken to modify one or more specific configuration parameter, and that have a high probability of reaching a desirable state, i.e. with desirable performance indicators, based on knowledge of historical responses to actions taken.

It is of course important to have the latest state of the system captured in the system state graph model, and thus there is disclosed a mechanism for incrementally updating the system state graph model.

This mechanism updates the system graph model by adding incoming datapoints to existing states or possibly evicting past data from states, e.g., based on their timestamp. Model update via data eviction can be possible since we assume a central model construction, which in turn means that the data can be stored and can be available for updating the graph by removing uninformative records.

In general terms, as new operational data is received from the units of the system, the probabilities can be recalculated to take account of the new data, and the system state graph model can be updated. In addition, old data can be excluded from the calculation, so that the system state graph model only takes account of data that is relatively recent.

This process means that relevant information is captured with a manageable state representation, since some states or actions with previously zero-mass (no data) may become active in the graph, whereas other states may be inactivated (if their data is evicted or if they contain many fewer occurrences than others). Policies, like eviction rules, can be adaptive depending on the nature of the cell feature/KPI. Moreover, the update frequency can be tuned based on complexity considerations. The space covered by the clusters is finite so as new datapoints arrive the system state graph model is updated.

Then, the new frequencies $n_{ij}^a$ can be calculated using the process described above. This also allows for a recalculation of the transition probabilities between states in response to specific actions.

Thus, the system state graph model is at any time representing the most recent information in a compressed model. For the model initialization and incremental learning phases, a Bayesian approach is also possible, in which the transitions from one state to any other state are modelled by a multinomial distribution and we use a uniform prior for the probability $P(S_j|S_i,a)$. In this case, we can employ methods like Markov Chain Monte Carlo (MCMC) for the initial graph modelling and Sequential Monte Chain (SMC) for updating the graph with incoming new data. The benefit of a Bayesian approach is that we also get an idea about how "certain" our system state graph model is by looking at the posterior distributions of the transitions.

In this illustrated example, FIG. 10(a) shows a central system state graph model 180, which is calculated centrally, and which is used to represent the properties of multiple units in a system. Of course, for this central system state graph model to be suitable for use when estimating the properties of all of the units, there is an assumption that all of the units have similar properties.

The central system state graph model can be updated, based on operational data received from all of the units in the system. However, this will not detect a situation where the properties of the units diverge for some reason. In that situation, a central system state graph model cannot accurately estimate the properties of all of the units.

Therefore, step 112 of the method shown in FIG. 5 comprises generating a respective updated system state graph model for each of the plurality of operational units, based on the central system state graph model and based on new operational data for the respective operational unit. In this case, each updated system state graph model represents the properties of the respective operational unit as the probabilities of transitions between states for the respective operational unit.

This is illustrated in FIGS. 10(b) and 10(c), where FIG. 10(b) illustrates an updated system state graph model 182 for a first of the plurality of operational units. This is generated at a time (say, t+m) later than the time (say, t) at which the central system state graph model 180 was generated, and is based on the central system state graph model 180 and also based on new operational data for the first unit. FIG. 10(c) illustrates an updated system state graph model 184 for a second of the plurality of units. This is also generated at a time (say, t+m) later than the time (say, t) at which the central system state graph model 180 was generated, typically the same time at which the updated system state graph model 182 was generated, and is based on the central system state graph model 180 and also based on new operational data for the second unit.

Specifically, FIG. 10(b) shows an updated system state graph model 182, in which, using the same notation as before:

$P(S_2|S_1,b)=0.33$
$P(S_4|S_1,b)=0.67$
$P(S_3|S_2,c)=0.26$
$P(S_4|S_2,c)=0.74$.

It can be seen that the updated system state graph model 182 is very similar to the central system state graph model 180, although the probability values have been updated. This means that the properties of the first unit have not diverged very significantly from the properties of the group of units whose properties are represented by the central system state graph model 180.

By contrast, FIG. 10(c) shows an updated system state graph model 184, which is used to represent the properties of the second operational unit. In the datapoints used to generate the updated system state graph model 184, taking the first action b while the unit is in the state $S_1$ has led with probability 0.6 to the state $S_3$, and has led with probability 0.4 to the state $S_4$. Taking the second action c while the unit is in the state $S_2$ has led with probability 0.65 to the state $S_1$, and has led with probability 0.35 to the state $S_4$.

Thus, using the same notation as before:

$P(S_3|S_1,b)=0.6$
$P(S_4|S_1,b)=0.4$
$P(S_1|S_2,c)=0.65$
$P(S_4|S_2,c)=0.35$.

It can therefore be seen that the updated system state graph model 184 is significantly different from the central system state graph model 180. This means that the properties of the second unit have diverged very significantly from the properties of the group of units whose properties are represented by the central system state graph model 180.

One illustration of this is that, for the unit whose properties are represented by the system state graph model 182 in FIG. 10(b), if we want to transit from state $S_1$ to state $S_3$, then it is necessary to take actions leading from $S_1$ to $S_2$ and then from $S_2$ to $S_3$. By contrast, for the unit whose properties are represented by the system state graph model 184 in FIG. 10(c), we can take a different action that leads directly from state $S_1$ to state $S_3$.

This divergence of the properties means that it may no longer be appropriate for a single central system state graph model to be used when estimating the properties of all of the operational units. Rather, better estimates of the properties of the units may be achieved by creating two or more separate central models for the diverging distributions, i.e. generating a plurality of new central system state graph models, each representing the properties of a respective subset of the plurality of units as probabilities of transitions between states for the respective subset of the plurality of units.

Thus, the process shown in FIG. 5 continues with step 114, namely determining a distance measure between the respective updated system state graph models.

Then, at step 116, the method comprises, if the distance measure between the respective updated system state graph models fulfils a divergence criterion, generating a plurality of new central system state graph models, each representing the properties of a respective subset of the plurality of operational units as probabilities of transitions between states for the respective subset of the plurality of operational units.

Different solutions are discussed below for detecting when the properties of the units have diverged or drifted apart, that is, for determining the distance measure between the respective updated system state graph models, and for determining if the distance measure between the respective updated system state graph models fulfils the divergence criterion, and for determining how the units should be re-clustered if necessary, in order to allow the new central system state graph models to maintain good performance with reliable predictions of the properties of the units.

In such scenarios, it may be more beneficial for the modelling to separate a divergent unit, such as the second unit whose properties are represented by the system state graph model 184 in FIG. 10(c), into a new partition with other units demonstrating similar behaviour, for example having similar system state graph models.

One way to measure the distribution drift is to compute the KL-divergence $D(p_c^t \| q_k^t)$ at time t between the state distribution p of the common central graph model and the state distributions $\{q_k^t\}_{K=1}^L$ of the system state graph models for the specific units. These local unit system state graph models can be reconstructed by using the local updates for the L units together with the central graph model at time t. In other words, we can compute for each unit its local update $q_k^{t+m}$, at time t+m, based on the central model and have this compared with a version of the central model. For example, for each unit, if the updates are calculated every m time units, i.e. at times . . . t−2m, t−m, t, t+m, t+2m, etc, then the local update $q_k^{t+m}$, at time t+m, may be compared with the current version of the central model, i.e. $p_c^{t+m}$. Alternatively, the local update $q_k^{t+m}$, at time t+m, may be compared with some earlier version of the central model, i.e. $p_c^{t-r}$, where r≥0. All these actions are carried out at the central node.

However, KL-divergence is not a distance metric but it can be adapted as $D_{c,k}^t \triangleq 0.5 \times [D(p_c^t \| q_k^t) + D(q_k^t \| p_c^t)]$. This adapted metric can be computed for all units and, thereafter, it can be checked whether some units deviate a lot. The deviation can be checked: a) by comparing $D_{c,k}^t$ to some selected threshold; b) by normalizing all $D_{c,k}^t$ values with the smallest deviation $D_{c,k}^{t,min}$ and flagging units whose relative distance exceeds some threshold; and c) comparing $D_{c,k}^t$ with $D_{c,k}^{t+m}$ to see if the unit has significant distance changes in the temporal domain.

The value of m can be tuned depending on the number of time-steps for which data is to be accumulated, and depending on how often we these computations are intended to be conducted.

To decide about cluster formation, it is possible to re-use or create new features that are evaluated every n time-units, where n m, and then run some clustering algorithm using these features.

Two sets of feature vectors are discussed herein, based on the computation of $q_k^t$ as described above:

i. For unit k, a vector $p_j^t = \{P(S_j | S_k, \alpha)\} \in \mathbb{R}^N$ is created, where N is the vector cardinality, containing all state transition probabilities. Thus, the vector has features characterising the system state graph model of the operational unit. This allows the similarity of the system state graphs for the operational units to be checked directly.

ii. For unit k, the distance metric $$D'_{j,k} \triangleq 0.5 \times [D(q_j^{t-n} \| q_k^t) + D(q_k^t \| q_j^{t-n})]$$

is computed, and vector $D_j^t = [D_{j,1}^t, \ldots, D_{j,L}^t]^T$ of length L is created. Thus, for each operational unit, a vector is formed comprising respective distances between a version of the system state graph model of the operational unit and the respective system state graph models of each other operational unit. The elements of $D_j^t$ indicate the temporal distance of operational unit k with itself as well as the other units.

Either of these two features can be used to conduct the clustering step. For instance, $p_j^t$ may seem more natural as a feature but its cardinality N can be arbitrarily large, rendering the subsequent task challenging. Hence if N>>L perhaps $D_j^t$ can be used instead.

Figure 11:
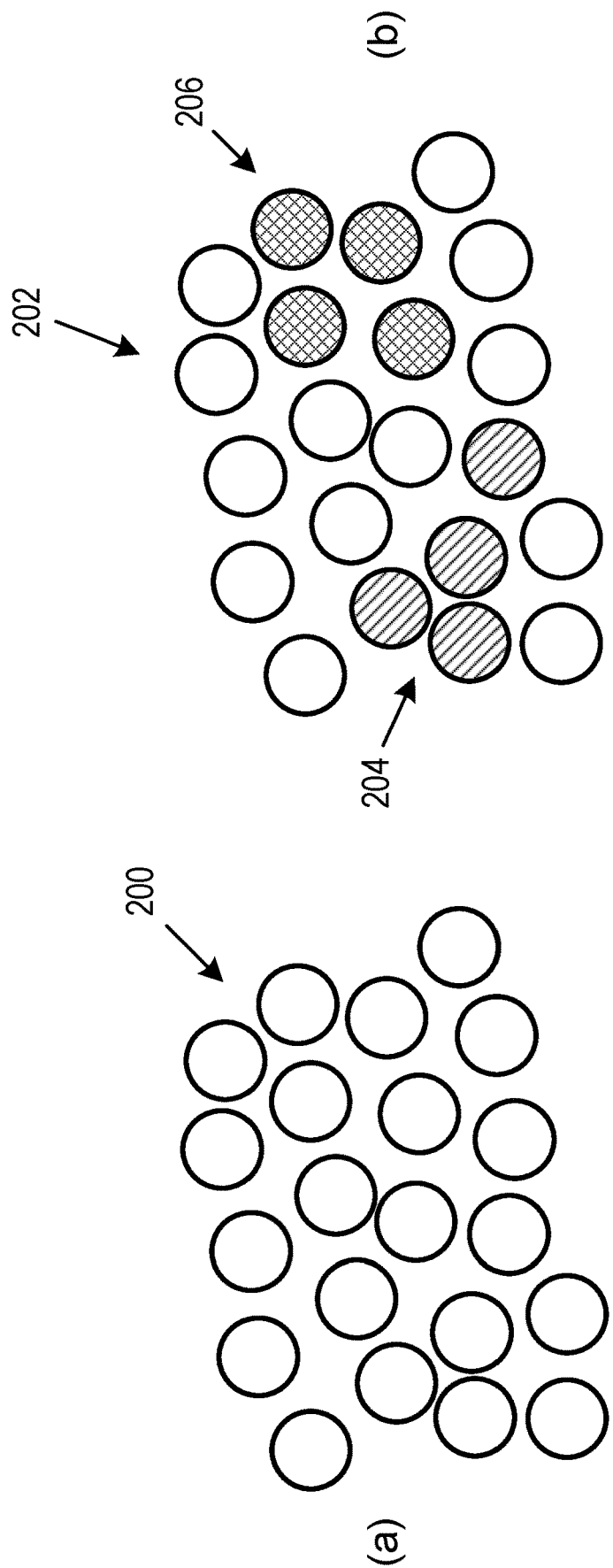
FIG. 11 illustrates a step in the method of FIG. 5.

The cell clustering step can result in dividing the initial set of units into respective subsets. FIG. 11 shows an example where, starting from a single set of units 200, as shown in FIG. 11(a), the clustering step generates three subsets of units, namely a first subset 202 of unshaded units, a second subset 204 of units with a first shading, and a third subset 206 of units with a second shading, as shown in FIG. 11(b).

In that case, it would be necessary to update three cluster distributions $\{p_{c,j}^t\}_{j=1}^3$, using the process described above. To avoid fragmentation of the units into too many groups, an upper limit can be set for the number of potential clusters. Another possibility is, during each cluster graph update, to also compute the distance between the cluster state distributions $p_{c,j}^t$, and potentially re-merge two clusters if the distance between them becomes them according to some criterion, for example if it becomes smaller than the distance computed when it was decided to create the clusters 202, 204, 206.

It may be advantageous to conduct the clustering an efficient way. For example, in the case where the units are cells of a communication network, for each cell j we have a feature vector of length N or L, whose values will typically be $\propto 10^3$, which would render the clustering task infeasible in the original space. To avoid this, methods are described for achieving dimensionality reduction.

The following analysis is described with reference to the distance vectors $D_j^t$ described above, but exactly the same procedure can be applied to the vector $p_j^t$.

One way to conduct dimensionality reduction is a stateless dimensionality reduction, namely by running principal component analysis (PCA) on the matrix $$D^t \triangleq [D_1^t, D_2^t, \ldots, D_L^t]$$

of dimensions L×L to reduce it to $$D'^t \triangleq [D_1'^t, D_2'^t, \ldots, D_L'^t]$$

of dimensions L×K, where K∝10. Hence, the distance vector $D_j^t$ is compressed to which has cardinality K and the clustering task now becomes feasible.

An alternative way to conduct dimensionality reduction is a stateful dimensionality reduction, as illustrated in FIG. 12.

As described with reference to the stateless dimensionality reduction, a vector is formed for each unit (i.e. each cell), and this may for example be the distance vector $D_j^t$ described above, or may be the vector $p_j^t$. The process is described below with reference to the use of the distance vector $D_j^t$.

Then, the following process is conducted iteratively until all vectors have been considered.

A subset of all the vectors is selected. The subset of vectors is reduced in size, or compressed, with a neural network 220 as shown in FIG. 12 acting as an autoencoder. The autoencoder implements the mapping $D'_j^t = f_\theta(D)$, that is, the encoder function $f_\theta$ is used for compression.

Then, the cluster centers are updated with the compressed subset of vectors, and the neural network weights are updated by training on a function of the error between the compressed vectors of the said subset of vectors and the updated cluster centers.

That is, the autoencoder can be initialized by holding out some data during the graph initialization phase in order to compute the distance vectors $D_j^t$. Then at each new time instance $t_0$, when $D_j^{t_0}$ is computed we jointly optimize the encoder function $f_\theta$ and the potential cluster centers $\mu_k^{t0}$. The distance between the compressed vectors $D'^{t0}_j$ and the k-th centroid $\mu_k^{t0}$ is denoted as $d_{jk}^{t0}=g(D'^{t0}_j,\mu_k^{t0})=g(f(D_j^{t0}),\mu_k^{t0})$, where $g(\bullet)$ is some distance function, and then the objective $L_i^{t0}=\Sigma_{k=1}^{i}\Sigma_j d_{jk}^{t0}$, where the subscript i denotes the number of clusters, and where this function represents the sum of the distances between the compressed vectors of the subset of vectors and the updated cluster centers. By minimizing this function, it is possible i) to reuse the previously trained autoencoder $f_\theta$ for compression and further clustering; and ii) to update the encoder function $f_\theta$ as new data is received. This is advantageous since training an autoencoder from scratch requires significant amounts of data.

The trained neural network can then be used as the initial neural network for compressing the feature vectors during the next execution of the process of generating a plurality of new central system state graph models.

In addition, the computed cluster centres, for a given number of clusters, are used as the initial cluster centres during the next execution of the process of generating a plurality of new central system state graph models. Thus, the cluster centres are not randomly initialized, but they are initialized with the previous cluster centres, which can be useful to provide stability over time, without drastically changing the clusters.

There is thus described a method that allows for efficient estimation of the properties of multiple units, by constructing a graph representation of the operational data relating to the units, allowing efficient incremental update of the graph representation, and detection of drift in the distribution of the states of units, and regrouping of the units.

The methods have been described above with specific reference to a technical system in the form of a communications network. In such a system, the configuration parameters comprise actions that are taken in radio network nodes of the system, while the performance parameters are performance indicators that are relevant to the customer experience.

Another example of a technical system in which the methods can be applied is a fleet of self-driving cars. For example, the configuration parameters could be actions such as changing speed, or turning left or right in certain circumstances, and the performance parameters could be such things as the probability of a crash, or a time-to-destination. It is probably not practical for each to have its own unique state-action model because there will not be sufficient data, so it is advantageous to collect data from a number of cars registered in an area. But the methods described herein allow for the cars to be grouped into subsets, with several central models to allowing the properties, i.e. the behaviour, of the subset of the cars to be estimated.

Similarly, another example of a technical system is a network of Internet of Things devices in a large building or facility, where the devices have means for controlling temperature, humidity, etc, and sensors for measuring these parameters. The configuration parameters may be the setting of the control devices, while the performance parameters may be the resulting temperature, humidity, etc. It may be suitable to have one state-action model that expresses the properties of all of the devices, or it may be decided that the properties have diverged, such that it would be preferable to branch and create several state action models, corresponding to respective clusters of the devices.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of estimating properties of a plurality of radio network nodes, the method comprising:
   generating a central system state graph model representing the properties of the plurality of radio network nodes as probabilities of transitions between states of the plurality of radio network nodes, wherein the states represent operational data;
   generating a respective updated system state graph model for each of the plurality of radio network nodes, based on the central system state graph model and based on new operational data for each respective radio network node, wherein each updated system state graph model represents properties of the respective radio network nodes as probabilities of transitions between states for the respective radio network node;
   determining a respective distance measure between each respective updated system state graph model of the updated models and a version of the central system state graph model;
   based on the distance measure between the respective updated system state graph models fulfilling a divergence criterion, generating a plurality of new central system state graph models, each new central state graph model representing properties of a respective subset of the plurality of radio network nodes as probabilities of transitions between states for the respective subset of the plurality of radio network nodes; and
   initiating control of at least one of the radio network nodes in one of the subsets based on the respective new central system state graph model.

2. A method of estimating properties of a plurality of operational units, the method comprising:
   generating a central system state graph model representing the properties of the plurality of operational units as probabilities of transitions between states of the plurality of operational units, wherein the states represent operational data;
   generating a respective updated system state graph model for each of the plurality of operational units, based on the central system state graph model and based on new operational data for each respective operational unit, wherein each updated system state graph model represents properties of the respective operational unit as probabilities of transitions between states for the respective operational unit;
   determining a distance measure between each respective updated system state graph model of the updated models and a version of the central system state graph model;
   based on the distance measure between the respective updated system state graph models fulfilling a divergence criterion, generating a plurality of new central system state graph models, each new central state graph model representing properties of a respective subset of the plurality of operational units as probabilities of transitions between states for the respective subset of the plurality of operational units; and
   initiating control of at least one of the radio network nodes in one of the subsets based on the respective new central system state graph model.

3. The method according to claim 2, wherein each state represents one or more datapoint of the operational data.

4. The method according to claim 3, wherein each datapoint of the operational data represents at least one configuration parameter and at least one performance parameter of the operational unit.

5. The method according to claim 3, wherein each datapoint represents at least one parameter of the operational unit, wherein values of the at least one parameter are placed into a finite number of bins.

6. The method according to claim 2, comprising generating the respective updated system state graph model representing the properties of a respective subset of the plurality of operational units as probabilities of transitions between states, by also excluding old operational data.

7. The method according to claim 2, wherein determining the distance measure between the respective updated system state graph models comprises:
determining a respective distance measure between each updated system state graph model and a version of the central system state graph model.

8. The method according to claim 7, wherein the respective distance measure between each updated system state graph model and the version of the central system state graph model is a function of a distance between distributions.

9. The method according to claim 7, comprising:
normalising each respective distance measure between each updated system state graph model and the version of the central system state graph model, and comparing the normalised distance measures with a threshold value.

10. The method according to claim 7, comprising:
comparing each respective distance measure between each updated system state graph model and the version of the central system state graph model with a previous respective distance measure between each respective updated system state graph model of the updated models and the respective version of the central system state graph model, and
determining whether the respective distance measure has changed with time.

11. The method according to claim 2, comprising:
for each operational unit, forming a vector comprising respective distances between a version of the system state graph model of the operational unit and the respective updated system state graph models of each other operational unit;
combining said vectors into a matrix;
performing principal component analysis on the matrix; and
clustering the operational units based on a result of the principal component analysis.

12. The method according to claim 2, comprising:
for each operational unit, forming a vector comprising features characterising the updated system state graph model of the operational unit;
combining said vectors into a matrix;
performing principal component analysis on the matrix; and
clustering the operational units based on a result of the principal component analysis.

13. The method according to claim 2, comprising:
for each operational unit, forming a vector comprising respective distances between a version of the system state graph model of the operational unit and the respective updated system state graph models of each other operational unit, and further comprising iteratively performing the following steps until all vectors are considered:
selecting a subset of said vectors;
compressing said subset of vectors using a neural network;
updating cluster centres using the compressed subset of vectors; and
training the neural network based on a function of an error between the compressed subset of vectors and the updated cluster centres.

14. The method according to claim 13, wherein the trained neural network is used as an initial neural network for compressing the vectors during a next execution of the process of generating the plurality of new central system state graph models.

15. The method according to claim 13, wherein the computed cluster centres, for a given number of clusters, are used as initial cluster centres during a next execution of the process of generating the plurality of new central system state graph models.

16. The method according to claim 2, comprising:
for each operational unit, forming a vector comprising features characterising the updated system state graph model of the operational unit, and further comprising iteratively performing the following steps until all vectors are considered:
selecting a subset of said vectors;
compressing said subset of vectors using a neural network;
updating cluster centres using the compressed subset of vectors; and
training the neural network based on a function of an error between the compressed subset of vectors and the updated cluster centres.

17. A method according to claim 2, wherein the operational units comprise radio network nodes.

18. A device for estimating properties of a plurality of operational units, the device comprising a processor, wherein the processor is configured to:
generate a central system state graph model representing the properties of the plurality of operational units as probabilities of transitions between states of the plurality of operational units, wherein the states represent operational data;
generate a respective updated system state graph model for each of the plurality of operational units, based on the central system state graph model and based on new operational data for each respective operational unit, wherein each updated system state graph model represents properties of the respective operational unit as probabilities of transitions between states for the respective operational unit;
determine a distance measure between each respective updated system state graph model of the updated models and a version of the central system state graph model;
based on the distance measure between the respective updated system state graph models fulfilling a divergence criterion, generate a plurality of new central system state graph models, each new central state graph model representing properties of a respective subset of the plurality of operational units as probabilities of transitions between states for the respective subset of the plurality of operational units; and initiate control of at least one of the radio network nodes in one of the subsets based on the respective new central system state graph model.

* * * * *